United States Patent
Komaru et al.

(10) Patent No.: US 12,504,399 B2
(45) Date of Patent: Dec. 23, 2025

(54) IMS ANALYZER

(71) Applicant: SHARP KABUSHIKI KAISHA, Sakai (JP)

(72) Inventors: Shohei Komaru, Sakai (JP); Tadashi Iwamatsu, Sakai (JP); Masamitsu Moritani, Sakai (JP); Katsuhiko Kyuhken, Sakai (JP); Shunsuke Matsuo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 395 days.

(21) Appl. No.: 18/111,714

(22) Filed: Feb. 20, 2023

(65) Prior Publication Data
US 2023/0273154 A1    Aug. 31, 2023

(30) Foreign Application Priority Data
Feb. 25, 2022  (JP) .................. 2022-028359

(51) Int. Cl.
*G01N 27/622* (2021.01)
*G01N 27/64* (2006.01)

(52) U.S. Cl.
CPC .......... *G01N 27/622* (2013.01); *G01N 27/64* (2013.01)

(58) Field of Classification Search
CPC ...... G01N 27/622; G01N 27/623; H01J 49/26
See application file for complete search history.

(56) References Cited

U.S. PATENT DOCUMENTS

| | | | | |
|---|---|---|---|---|
| 5,032,721 A | * | 7/1991 | Bacon | G01N 27/622 250/288 |
| 5,071,771 A | * | 12/1991 | Barbour | G01N 27/622 250/282 |
| 5,109,157 A | * | 4/1992 | Loen | G01N 27/622 250/281 |
| 5,552,600 A | * | 9/1996 | Davies | G01N 27/622 250/289 |
| 5,574,277 A | * | 11/1996 | Taylor | G01N 27/622 250/281 |

(Continued)

FOREIGN PATENT DOCUMENTS

| | | |
|---|---|---|
| JP | H11-176375 A | 7/1999 |
| JP | 2006-086002 A | 3/2006 |

(Continued)

*Primary Examiner* — David A Vanore
(74) *Attorney, Agent, or Firm* — ScienBiziP, P.C.

(57) ABSTRACT

The present disclosure provides an IMS analyzer including an analysis chamber, an electron emitter, an ion detector, a first gas injector that injects a sample gas into the analysis chamber, a second gas injector that injects a drift gas into the analysis chamber, a third gas injector that injects a primary ion generating gas into the analysis chamber, and an outlet port, in which the first gas injector, the second gas injector, the third gas injector, and the outlet port are arranged such that the sample gas merges with the drift gas and the primary ion generating gas in a reaction area and is discharged through the outlet port, the ion detector is located on an upperstream side of the drift gas stream relative to the reaction area, and the electron emitter is located on an upperstream side of the primary ion generating gas stream relative to the reaction area.

8 Claims, 5 Drawing Sheets

(56) References Cited

U.S. PATENT DOCUMENTS

| | | | | |
|---|---|---|---|---|
| 6,291,821 | B1 * | 9/2001 | Danylewych-May | ........................ G01N 27/622 250/286 |
| 6,407,382 | B1 * | 6/2002 | Spangler | .............. G01N 27/623 250/288 |
| 10,551,348 | B2 * | 2/2020 | Yasuno | ................. G01N 27/622 |
| 2002/0017605 | A1 * | 2/2002 | Jenkins | ................... H01J 49/12 250/286 |
| 2005/0178957 | A1 * | 8/2005 | Pusterla | ............... G01N 27/622 250/282 |
| 2006/0054806 | A1 | 3/2006 | Yamada et al. | |
| 2006/0054809 | A1 * | 3/2006 | Giannantonio | ...... G01N 27/622 250/290 |
| 2007/0176092 | A1 * | 8/2007 | Miller | .................. G01N 27/624 250/288 |
| 2008/0073503 | A1 * | 3/2008 | Wu | ....................... G01N 27/622 250/281 |
| 2009/0095917 | A1 * | 4/2009 | Doring | .................. H01J 49/145 250/424 |
| 2019/0302055 | A1 * | 10/2019 | Komaru | ................. G01N 27/64 |
| 2021/0057204 | A1 * | 2/2021 | Liu | ......................... H01J 49/24 |
| 2021/0335590 | A1 | 10/2021 | Moritani et al. | |
| 2023/0273154 | A1 * | 8/2023 | Komaru | ................. G01N 27/64 250/281 |

FOREIGN PATENT DOCUMENTS

| | | | |
|---|---|---|---|
| JP | 2019-186190 | A | 10/2019 |
| JP | 2021-173580 | A | 11/2021 |

\* cited by examiner

IMS ANALYZER

BACKGROUND OF THE INVENTION

Field of the Invention

The present disclosure relates to an ion mobility spectrometry (IMS) analyzer.

Description of the Background Art

In conventional IMS analyzers, sample gasses have been ionized by radiation, corona discharge, or the like. Since radiation and corona discharge have high energy, a sample gas may be chemically decomposed when ionized. In this case, numerous ions generated by the decomposition of the sample gas are detected by a detector, and many peaks appear in an IMS spectrum. This makes it difficult to identify a sample gas in IMS analysis.

There are known IMS analyzers that ionize a sample gas by using low-energy electrons emitted from an electron emitter. This analyzer makes it possible to prevent a sample gas from chemically decomposing to facilitate identification of the sample gas.

In some cases, detection sensitivity becomes unstable and air peaks split in an IMS spectrum obtained by an IMS analyzer using an electron emitter. For this reason, IMS analyses have low quantitativity.

The present disclosure was made in view of the above circumstances, and an object of the present disclosure is to provide an IMS analyzer that makes it possible to obtain an IMS spectrum with stable detection sensitivity and has improved quantitativity.

SUMMARY OF THE INVENTION

The present disclosure provides an IMS analyzer including an analysis chamber, an electron emitter located in the analysis chamber, an ion detector located in the analysis chamber, a first gas injector that injects a sample gas into the analysis chamber, a second gas injector that injects a drift gas into the analysis chamber, a third gas injector that injects a primary ion generating gas into the analysis chamber, and an outlet port through which the gases in the analysis chamber are discharged, in which the first gas injector, the second gas injector, the third gas injector, and the outlet port are arranged such that the sample gas merges with the drift gas and the primary ion generating gas in a reaction area and is discharged through the outlet port, the ion detector is located on an upperstream side of a drift gas stream relative to the reaction area, and the electron emitter is located on an upperstream side of a primary ion generating gas stream relative to the reaction area.

The electron emitter is located on an upperstream of the primary ion generating gas stream relative to the reaction area. This makes it possible to prevent the sample gas from arriving at the electron emitter and to stabilize a gas composition surrounding an electrode (surface electrode) on an electron-emitting side of the electron emitter (a state where the primary ion generating gas is flowing). Also, the gas stream in the analysis chamber can be stabilized.

Around the electrode on the electron-emitting side of the electron emitter, electrons emitted from the electron emitter collide with the gas to generate primary ions (negative or positive ions). Since the gas composition surrounding the electrode is stabilized by the primary ion generating gas, an amount of the generated primary ions can also be stabilized.

Also, an ionic species of the primary ions can be stabilized. The primary ions serve as a mediator.

The generated primary ions which have moved to the reaction area by the primary ion generating gas stream and an electric field generated in the analysis chamber, donate or receive electric charges to or from a detection-objective component contained in the sample gas injected from the first gas injector to generate negative or positive ions (ion molecular reaction). Since the amount and ion species of the primary ions are stabilized by flowing the primary ion generating gas and since the gas stream in the analysis chamber is stabilized, the amount of the detection-objective component ions generated in the reaction area is stabilized, and the ion species of the detection-objective component ions generated in the reaction area is also stabilized. Since these ions arrive at the ion detector and are detected, the detection sensitivity in the IMS spectrum can be stabilized and intensities of peaks in the IMS spectrum can be stabilized when the analysis is repeated multiple times. Thus, the quantitativity of the IMS analysis can be improved.

DESCRIPTION OF THE PREFERRED EMBODIMENTS

The IMS analyzer according to the present disclosure characteristically includes an analysis chamber, an electron emitter located in the analysis chamber, an ion detector located in the analysis chamber, a first gas injector that injects a sample gas into the analysis chamber, a second gas injector that injects a drift gas into the analysis chamber, a third gas injector that injects a primary ion generating gas into the analysis chamber, and an outlet port through which the gases in the analysis chamber are discharged, in which the first gas injector, the second gas injector, the third gas injector, and the outlet port are arranged such that the sample gas merges with the drift gas and the primary ion generating gas in a reaction area and is discharged through the outlet port, the ion detector is located on an upperstream side of a drift gas stream relative to the reaction area, and the electron emitter is located on an upperstream side of a primary ion generating gas stream relative to the reaction area.

Preferably, each of the first gas injector, the second gas injector, and the third gas injector injects the gas into the analysis chamber from different positions.

Preferably, the third gas injector injects the primary ion generating gas into the analysis chamber while the first gas injector is injecting the sample gas into the analysis chamber. The primary ion generating gas is preferably moist air, an oxygen-containing gas, or a chlorine-containing gas. Thereby, primary ions can be stably generated around a surface electrode of the electron emitter.

A pressure in the analysis chamber is preferably 630 hPa or higher and 1120 hPa or lower Thereby, the air pressure in the analysis chamber is substantially equal to the atmospheric pressure, and the IMS analyzer can be downsized.

Preferably, the third gas injector has an inlet port through which the primary ion generating gas is injected into the analysis chamber, and the electron emitter is located between the inlet port and the reaction area. Thereby, the primary ion generating gas can be allowed to stably flow to around the electron emitter, and primary ions can be stably generated around the surface electrode of the electron emitter.

Preferably, the third gas injector injects air having a higher relative humidity than of the drift gas into the analysis chamber. This makes it possible to increase the detection sensitivity of the IMS analyzer.

Preferably, the third gas injector injects air with a relative humidity of 0.5% or higher and 10% or lower into the analysis chamber. This makes it possible to increase the detection sensitivity of the IMS analyzer.

An embodiment of the present disclosure will be explained below with reference to the figures. The configurations illustrated in the figures or the description below are illustrative, and the scope of the disclosure is not limited to the figures or the description below.

Figure 1:
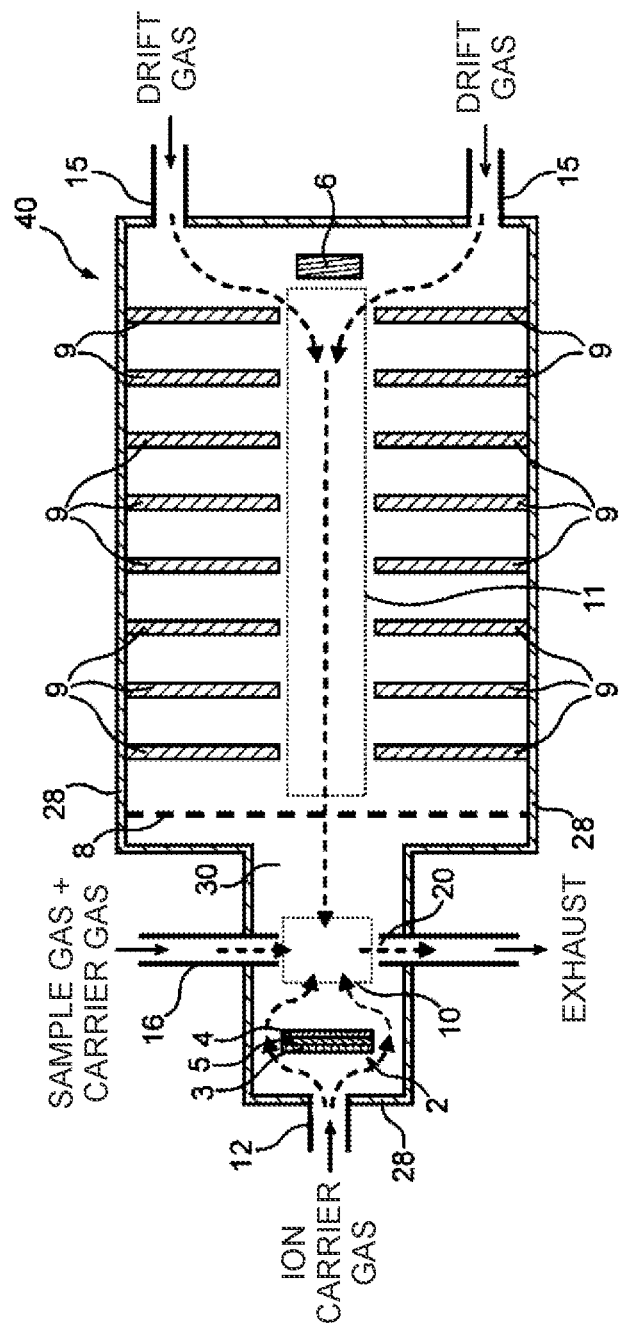
FIG. 1 is a schematic sectional view illustrating an IMS analyzer according to an embodiment of the present disclosure.
Figure 2:
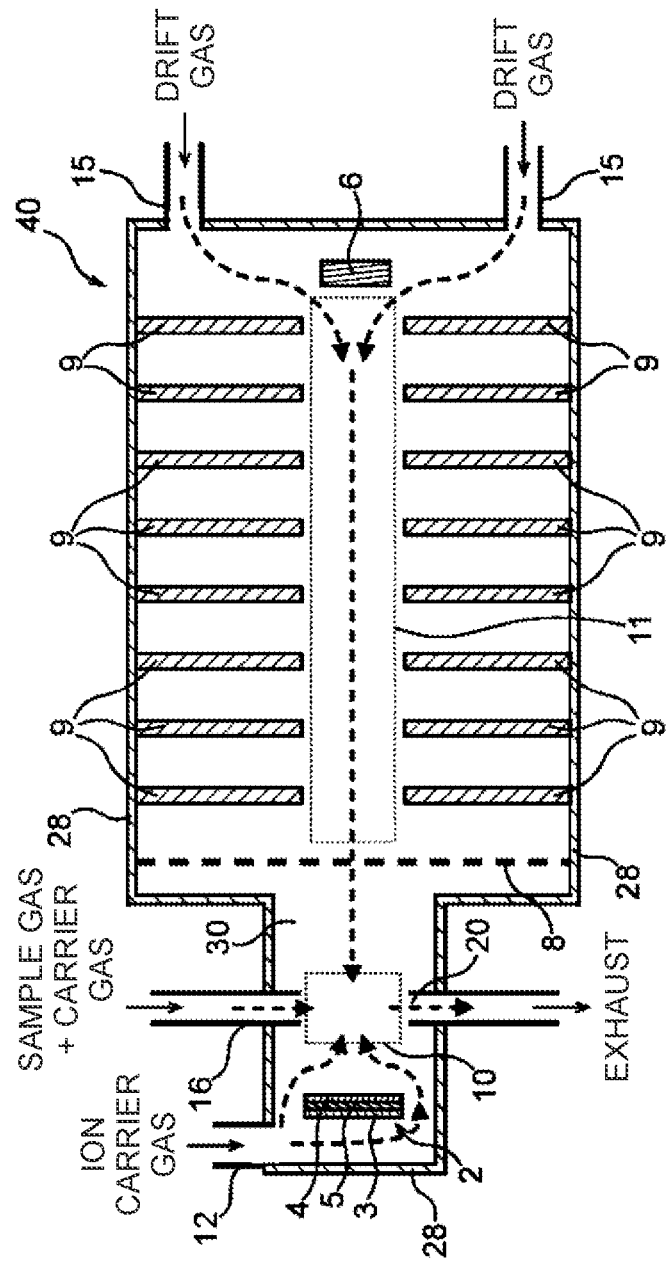
FIG. 2 is a schematic sectional view illustrating the IMS analyzer according to an embodiment of the present disclosure.

FIG. 1 and FIG. 2 are each a schematic sectional view illustrating an IMS analyzer according to the present embodiment.

An IMS analyzer 40 according to the present disclosure characteristically includes an analysis chamber 30, an electron emitter 2 located in the analysis chamber 30, an ion detector 6 located in the analysis chamber 30, a first gas injector 16 that injects a sample gas into the analysis chamber 30, a second gas injector 15 that injects a drift gas into the analysis chamber 30, a third gas injector 12 that injects a primary ion generating gas into the analysis chamber 30, and an outlet port 20 through which the gases in the analysis chamber 30 are discharged, in which the first gas injector 16, the second gas injector 15, the third gas injector 12, and the outlet port 20 are arranged such that the sample gas merges with the drift gas and the primary ion generating gas in a reaction area 10 and is discharged through the outlet port 20, the ion detector 6 is located on an upperstream side of the drift gas stream relative to the reaction area 10, and the electron emitter 2 is located on an upperstream side of the primary ion generating gas stream relative to the reaction area 10.

The IMS analyzer 40 is a device that analyzes a sample by ion mobility spectrometry (IMS). The analyzer 40 may be an ion mobility spectrometer. The analyzer 40 may be an IMS analyzer that makes an analysis with a drift tube-method IMS. The sample gas to be analyzed by the IMS analyzer 40 may be a gaseous sample or a sample of vaporized liquid.

The IMS analyzer 40 has the analysis chamber 30 (inside a housing 28) where a detection-objective component in the sample gas is analyzed. The housing 28 can have a rectangular cross-section or a partially-protruding rectangular cross-section. The IMS analyzer 40 illustrated in FIG. 1 and FIG. 2 has a partially-protruding rectangular cross-section.

The analysis chamber 30 contains the ion detector 6, the electron emitter 2, an electrostatic gate electrode 8, an electric field generating electrode 9, and the like. The sample gas is injected from the first gas injector 16 into the analysis chamber 30, the drift gas is injected from the second gas injector 15 into the analysis chamber 30, and the primary ion generating gas is injected from the third gas injector 12 into the analysis chamber 30. The gas in the analysis chamber 30 is exhausted through the outlet port 20. The analysis chamber 30 can have a reaction area 10 and an ion mobile area 11. The pressure in the analysis chamber 30 can be 630 hPa or higher and 1120 hPa or lower. Thereby, the air pressure in the analysis chamber 30 can be substantially equal to the atmospheric pressure, and the IMS analyzer can be downsized.

The reaction area 10 is an area where the detection-objective component is ionized. The ion mobile area 11 is an area where ionized detection-objective component moves to the ion detector against the flow of the drift gas.

The electron emitter 2 is an element that emits electrons from a surface electrode 4 and ionizes the gas surrounding the electron emitter 2 (surface electrode 4) via the emitted electrons to generate primary ions (negative or positive ions). The electron emitter 2 includes a bottom electrode 3, the surface electrode 4, and an intermediate layer 5 located between the bottom electrode 3 and the surface electrode 4. The electron emitter 2 can be arranged such that the surface electrode 4 faces the reaction area 10 side. Thus, the primary ions generated around the surface electrode 4 can be stably supplied to the reaction area 10.

The surface electrode 4 is located on the surface of the electron emitter 2. Preferably, the surface electrode 4 can have a thickness of 10 nm or more and 100 nm or less. The material for the surface electrode 4 is gold or platinum, for example. The surface electrode 4 may be composed of a plurality of metal layers.

Even when having a thickness of 40 nm or more, the surface electrode 4 may have a plurality of openings, gaps, or thinned portions with a thickness of 10 nm or less. The electrons, which have flowed through the intermediate layer 5, are able to pass through or permeate such openings, gaps or thinned portions, making it possible to emit the electrons from the surface electrode 4. The openings, gaps, or thinned portions as above may also be formed by applying a voltage to between the bottom electrode 3 and the surface electrode 4.

The bottom electrode 3 is an electrode facing the surface electrode 4 via the intermediate layer 5. The bottom electrode 3 may be a metal plate, or a metal layer or conductor layer that is formed on an insulating substrate or on a film. If the bottom electrode 3 is composed of the metal plate, the metal plate may be a substrate of the electron emitter 2.

Examples of the material for the bottom electrode 3 include aluminum, a stainless steel, nickel, and the like. The bottom electrode 3 has a thickness of e.g. 200 µm or more and 1 mm or less.

The intermediate layer 5 is a layer through which electrons flow due to the electric field generated by applying a voltage to between the surface electrode 4 and the bottom electrode 3. The intermediate layer 5 can be semiconductive. The intermediate layer 5 can include at least one of an insulating resin, an insulating fine particle, and a metal oxide. The intermediate layer 5 preferably includes conductive fine particles. The intermediate layer 5 can have a thickness of e.g. 0.5 µm or more and 1.8 µm or less. The intermediate layer 5 is, for example, a silicone resin layer having silver fine particles in a dispersed state.

The surface electrode 4 and the bottom electrode 3 are each electrically connectable with a controller. The controller controls a magnitude of a voltage (drive voltage of the electron emitter 2) applied to between the surface electrode 4 and the bottom electrode 3. When a potential of the bottom electrode 3 is made substantially the same as a potential of the surface electrode 4 (the drive voltage is set to 0 V) using the controller, no electric current flows through the intermediate layer 5 and no electrons are emitted from the electron emitter 2.

Once a voltage (drive voltage) is applied to between the bottom electrode 3 and the surface electrode 4 using the controller such that the potential of the bottom electrode 3 is lower than of the surface electrode 4, an electric current flows through the intermediate layer 5, then electrons which have flowed through the intermediate layer 5 pass through the surface electrode 4 and are emitted from the electron emitter 2. The voltage applied to between the bottom electrode 3 and the surface electrode 4 in order to cause the electron emitter 2 to emit electrons can be set to e.g. 5 V or higher and 40 V or lower.

The controller is a portion that controls the IMS analyzer. The controller can include a microcontroller having a central processing unit (CPU), a storage, a timer, and an input and output port, for example. The controller may also include an electric field controller, a gate controller, a drive voltage controller, a recovery current measurer, a power supply, and the like.

The third gas injector 12 is a portion that injects the primary ion generating gas into the analysis chamber 30. The primary ion generating gas is to be supplied to around the electron emitter 2 and receives the electrons emitted from the electron emitter 2 to generate primary ions. Examples of the primary ion generating gas include moist air, oxygen-containing gas, oxygen gas, chlorine-containing gas, chlorine gas, and the like. Preferably, the primary ion generating gas is air with constant humidity (e.g. a relative humidity (at a temperature of 10° C. to 30° C., 1 atm) is 0.5% or higher and 10% or lower, or a moisture content (molar fraction) is 30 ppmv or higher and 5000 ppmv or lower). The relative humidity of the primary ion generating gas is preferably higher than of the drift gas. This makes it possible to increase the detection sensitivity of the IMS analyzer 40.

When the primary ion generating gas contains oxygen molecules and water molecules, primary ions can be stably generated around the surface electrode 4.

The third gas injector 12 can have an inlet port through which the primary ion generating gas is injected into the analysis chamber 30. The third gas injector 12 may also include a gas cylinder, an air compressor, a blower, a humidity conditioner, and the like. The humidity conditioner is arranged such that the humidity of the primary ion generating gas to be injected into the analysis chamber 30 is constant (e.g. humidity conditioning unit).

The primary ion generating gas injected into the analysis chamber 30 by the third gas injector 12 flows around the electron emitter 2 and into the reaction area 10. That means, the electron emitter 2 is located on the upperstream side of the primary ion generating gas stream relative to the reaction area 10.

For example, as in the IMS analyzer 40 illustrated in FIG. 1 and FIG. 2, the third gas injector 12 and the electron emitter 2 can be arranged such that the primary ion generating gas injected into the analysis chamber 30 flows around the electron emitter 2 to arrive at the reaction area 10. The electron emitter 2 may be located between the inlet port of the third gas injector 12 and the reaction area 10, as illustrated in FIG. 1. The third gas injector 12 may inject the primary ion generating gas from a lateral side into a space behind the bottom electrode 3 of the electron emitter 2, as illustrated in FIG. 2.

This third gas injector 12 makes it possible to prevent the sample gas from arriving at the electron emitter 2, so that air surrounding the electron emitter 2 can be stably converted into the primary ion generating gas. As a result, the amount and ion species of the primary ions generated by the emitted electrons of the electron emitter 2 can be stabilized, and therefore the detection sensitivity in the IMS spectrum can be stabilized. The amount of the primary ions can be regulated e.g. by regulating the voltage applied to between the surface electrode 4 and the bottom electrode 3 (by regulating the electron emission amount of the electron emitter 2).

Once electrons are emitted from the electron emitter 2 (surface electrode 4) into the primary ion generating gas, the electrons immediately collide with components of the primary ion generating gas to generate the primary ions (negative or positive ions). Once the electrons emitted from the electron emitter 2 attaches to the gaseous components surrounding the surface electrode 4 (electron attachment phenomenon), negative ions of the gaseous components are generated. When the energy of the electrons emitted from the electron emitter 2 is higher than an ionization energy of the gaseous components surrounding the surface electrode 4, positive ions of the gaseous components are generated. When the primary ion generating gas is moist air, the primary ions (negative ions) are e.g. $O_2^-$, $OH^-$, or the like.

The electric field generated in the analysis chamber 30 by the electron emitter 2, the electrostatic gate electrode 8, the electric field generating electrode 9, and the like, and the flow of the primary ion generating gas injected into the analysis chamber 30 by the third gas injector 12, allow the primary ions generated around the electron emitter 2 (surface electrode 4) to move to the reaction area 10. The primary ions become charge transport mediators that donate or receive electric charges to or from the detection-objective component in the reaction area 10.

The electric field in the analysis chamber 30 is generated by controlling potentials of the electron emitter 2, the electrostatic gate electrode 8, the electric field generating electrode 9, the ion detector 6, and the like using the controller.

The controller controls the potentials of the electron emitter 2, the electrostatic gate electrode 8, the electric field generating electrode 9, the ion detector 6, and the like, to generate a potential gradient where the primary ions generated around the electron emitter 2 (surface electrode 4) move to the reaction area 10. Also, the controller controls the potentials of the electron emitter 2, the electrostatic gate electrode 8, the electric field generating electrode 9, the ion detector 6, and the like, to generate a potential gradient where the ions that have been passed through the electrostatic gate electrode 8 move to the ion detector 6. The inclinations of the generated potential gradients are opposite to each other between the case that the detection-objective gas contained in the sample gas is detected as negative ions (negative ion mode) and the case that the detection-objective gas contained in the sample gas is detected as positive ions (positive ion mode).

The first gas injector 16 is a portion that injects the sample gas containing the analysis-objective component into the analysis chamber 30. The first gas injector 16 may inject the sample gas into the analysis chamber 30 together with the carrier gas. The first gas injector 16 may inject the sample gas (or sample gas+carrier gas) into the reaction area 10 of the analysis chamber 30.

The first gas injector 16 can have an inlet port through which the sample gas is injected into the analysis chamber 30. The first gas injector 16 may include a gas cylinder, an air compressor, a blower, a sample vaporization chamber, and the like. The first gas injector 16 may include a mixing chamber where the carrier gas and the sample (sample gas or liquid sample) are mixed, a dilution chamber where the sample gas is diluted with the carrier gas, or the like. The carrier gas is to be injected into the analysis chamber 30 together with the sample gas. Examples of the carrier gas include air, helium gas, argon gas, nitrogen gas, and the like.

A distance from the inlet port of the first gas injector 16 to the electron emitter 2 can be set to 5 cm or longer. This makes it possible to prevent the sample gas from arriving at the electron emitter 2. The electron emitter 2 can be arranged such that the sample gas-injecting direction of the first gas injector 16 is parallel to the surface electrode 4 of the electron emitter 2. This makes it possible to prevent the sample gas from arriving at the electron emitter 2.

The sample gas injected from the first gas injector 16 into the reaction area 10 merges with the primary ion generating gas that has flowed from the electron emitter side and the drift gas that has flowed from the ion detector 6 side in the reaction area 10 and is exhausted through an outlet port 20. This airflow makes it possible to prevent the sample gas from flowing toward the electron emitter 2. The outlet port 20 may be arranged such that the gas in the analysis chamber 30 is forcedly exhausted by an exhaust fan or the like or naturally exhausted.

A ratio of an injection flow rate of the sample gas (or sample gas+carrier gas) injected into the analysis chamber 30 using the first gas injector 16 to an injection flow rate of the primary ion generating gas injected into the analysis chamber 30 using the third gas injector 12 can be e.g. 0.5 or higher and 2 or lower.

The inlet port of the first gas injector 16 can be located adjacent to the reaction area 10. The outlet port 20 can also be located adjacent to the reaction area 10. When the housing 28 has a rectangular cross-section or a partially-protruding rectangular cross-section, the inlet port of the first gas injector 16 can be located on a first side wall of the housing 28 constituting the analysis chamber 30 or on a portion protruding from the first side wall, and the outlet port 20 can be located on a second side wall opposite to the first side wall or on a portion protruding from the second side wall.

When the housing 28 has a rectangular cross-section or a partially-protruding rectangular cross-section, the inlet port of the third gas injector 12 can be located on a third side wall of the housing 28 or on a portion protruding from the third side wall, and the inlet port of the second gas injector 15 can be located on a fourth side wall opposite to the third side wall or on a portion protruding from the fourth side wall. When the housing 28 has a partially-protruding rectangular cross-section, the inlet port of the first gas injector 16, the inlet port of the third gas injector 12, and the outlet port 20 can be located on a protruding (narrower) portion of the housing 28.

When the housing 28 has a rectangular cross-section or a partially-protruding rectangular cross-section, the electron emitter 2 can be located at a distance of no shorter than 5 cm from the position of the inlet port of the first gas injector 16 toward the inlet port of the third gas injector 12 such that the surface electrode 4 faces the reaction area 10.

In the reaction area 10, the sample gas, the primary ion generating gas, and the drift gas are mixed together to produce a gas mixture. Primary ions move into the reaction area 10 due to the electric field and the primary ion generating gas stream. In the reaction area 10, the primary ions donate or receive the electric charges to or from the detection-objective component contained in the sample gas to generate negative or positive ions of the detection-objective component contained in the sample gas (ion molecular reaction).

Since the amount and ion species of the primary ions are stabilized by allowing the primary ion generating gas to flow through the reaction area 10, the detection-objective component can be ionized stably (in terms of quantity and type) in the reaction area 10.

The second gas injector 15 is a portion that injects the drift gas into the analysis chamber 30. The drift gas flows in the ion mobile area 11 in a direction opposite to the ion mobile direction and serves as a resistance while ions move through the ion mobile area 11. The drift gas may be air (purified air) prepared by purifying atmospheric air, air supplied from a compressed air cylinder, or air prepared by purifying air discharged through the outlet port 20 from the analysis chamber 30. The drift gas may be helium gas, argon gas, or nitrogen gas. The second gas injector 15 and the outlet port 20 are arranged such that the drift gas flows from the ion detector side toward the electrostatic gate electrode side in the ion mobile area 11. For example, the second gas injector 15 can supply the drift gas from the ion detector side to the ion mobile area 11.

The injection flow rate of the drift gas injected into the analysis chamber 30 using the second gas injector 15 can be made higher than the total injection flow rate of the first gas injector 16 and the third gas injector 12. This makes it possible to stabilize the airflow in the ion mobile area 11 and improve the ion separation performance of the IMS analyzer 40.

The electrostatic gate electrode 8 is located between the reaction area 10 and the ion mobile area 11 and controls, by using the electrostatic interaction between the ions and the electrostatic gate electrode 8, the injection of the ions generated in the reaction area 10, into the ion mobile area 11.

The electrostatic gate electrode 8 is, for example, a grid-shaped electrode (shutter grid). The electrostatic gate electrode 8 can be so arranged as to line up along with the plurality of electric field generating electrodes 9. The electrostatic gate electrode 8 can be electrically connected to the controller. The electrostatic gate electrode 8 can change the potential gradient generated in the analysis chamber 30.

The controller changes the potential of the electrostatic gate electrode 8 in such a manner that the potential state is instantaneously changed from a closed state at a low potential side (a state where, because the potential of the electrostatic gate electrode 8 is low, ions cannot pass through the electrostatic gate electrode 8 and cannot move to the ion mobile area 11) to a closed state at a high potential side (a state where, because the potential of the electrostatic gate electrode 8 is high, the ions cannot pass through the electrostatic gate electrode 8 and cannot move to the ion mobile area 11), or in such a manner that the potential state is instantaneously changed from the closed state at the high potential side to the closed state at the low potential side. This allows the electrostatic gate electrode 8 to be in an open state for a very short time, and allows the ions to be injected into the ion mobile area 11 for only this very short time. Thus, the ions can be injected, in a single pulse form, into the ion mobile area 11.

The negative ions or positive ions injected into the ion mobile area 11 move through the ion mobile area 11 toward the ion detector 6 by the potential gradient generated in the analysis chamber 30, and arrive at the ion detector 6. At this time, the negative or positive ions move against the drift gas stream. This drift gas stream serves as the resistance to the negative or positive ions moving from the electrostatic gate electrode 8 towards the ion detector 6. A magnitude of the resistance (ion mobility) depends on ion species. In general, mobility is inversely proportional to the collisional cross-sectional area of the ion (the size of ion), so the larger the collisional cross-sectional area of the ion, the longer it takes for the ion to arrive at the ion detector 6 (the larger the ion, the more frequently the ion collides with air molecules in the drift gas, and thereby the slower the ion's mobile speed and the more delayed the ion arrives at the ion detector 6). Thus, the time from when the ions are injected into the ion mobile area 11 by the electrostatic gate electrode 8 to when the ions arrive at the ion detector 6 (arrival time, peak position) varies depending on the ion species of negative or positive ions. As a result, it is possible to specify negative ions or positive ions (the detection-objective component contained in the sample) based on this arrival time (peak position). The ions of a plurality of detection-objective components contained in the sample gas can be separated from each other in the ion mobile area 11.

The ion detector 6 is a metal member that collects the electric charges of the negative or positive ions. The ion detector 6 can be electrically connected to the recovery current measurer in the controller. The recovery current measurer measures, in a time series, the recovery current generated when the negative or positive ions receive or donate the electric charges from or to the ion detector 6. This makes it possible to measure a current waveform (IMS spectrum) of the recovery current.

Plural types of ions injected, in a single pulse form, into the ion mobile area 11 using the electrostatic gate electrode 8 are separated into the respective types of ions while moving through the ion mobile area 11, and the respective types of ions arrive at the ion detector 6 with a time lag. As a result of this, the current waveform (IMS spectrum) of the recovery current shows a waveform having a peak that corresponds to the arrival time of each type of the ion, and a mobility can be calculated from the peak position (arrival time), making it possible to discriminate the component of the ion. Thus, the detection-objective component can be detected and identified. Since the peak height or peak area of the current waveform of the recovery current corresponds to the electric charge amount received from or donated to the ion detector 6 by each type of the ion, the detection-objective component can be subjected to a quantitative analysis based on the peak height or peak area.

In the present disclosure, the primary ion generating gas is supplied to around the electron emitter 2 using the third gas injector 12, therefore the ion species and the generated amount of the primary ions generated around the surface electrode 4 can be stabilized, and the ion species and the generated amount of the detection-objective component ions generated in the reaction area 10 can also be stabilized. Thus, the ion species and the amount of the detection-objective component ions that have arrived at the ion detector 6 are also stabilized, and the current waveform (IMS spectrum) of the recovery current is also stabilized. As a result, the IMS analyzer according to the present disclosure can be used to improve the quantitativity of IMS analysis. The detection and identification of the detection-objective component can also be simplified.

IMS Analysis

Figure 3A:
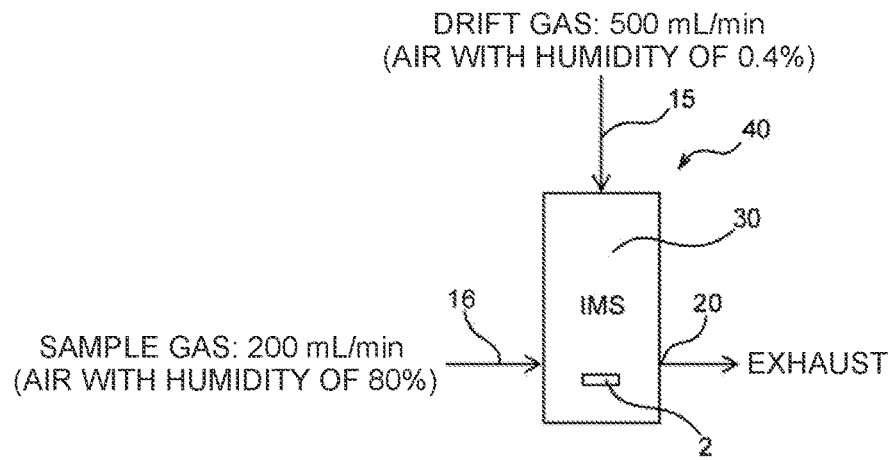
FIG. 3A is an explanatory diagram illustrating a structure of the IMS analyzer used for IMS analysis.
Figure 3B:
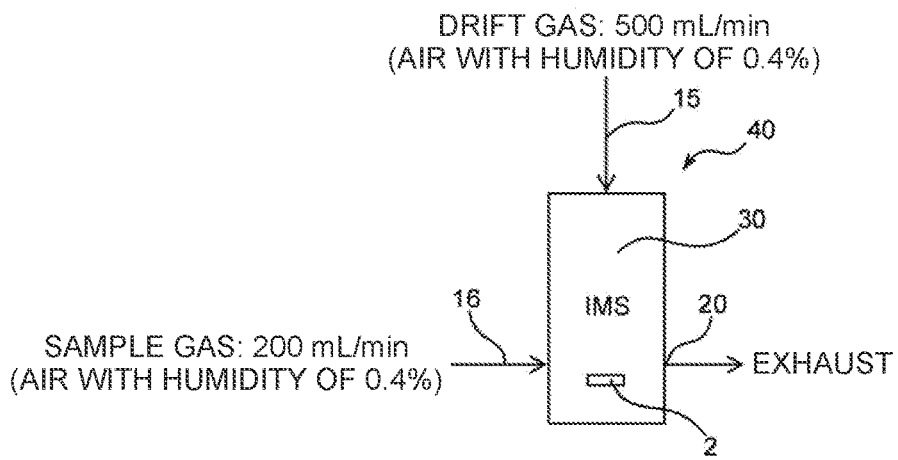
FIG. 3B is an explanatory diagram illustrating the structure of the IMS analyzer used for IMS analysis.

The IMS analyzer equipped with the electron emitter 2 as illustrated in FIG. 3A and FIG. 3B (Comparative Example) was used to perform IMS analysis for analyzing a sample gas (air with a relative humidity of 80% or air with a relative humidity of 0.4%). This IMS analyzer does not include a third gas injector 12. Air with the relative humidity of 0.4% is used as the drift gas, and the electron emitter 2 is arranged such that the sample gas injected from the first gas injector 16 into the analysis chamber 30 collides with the electron emitter 2. The drive voltage of the electron emitter 2 was set to 13 V.

Figure 3C:
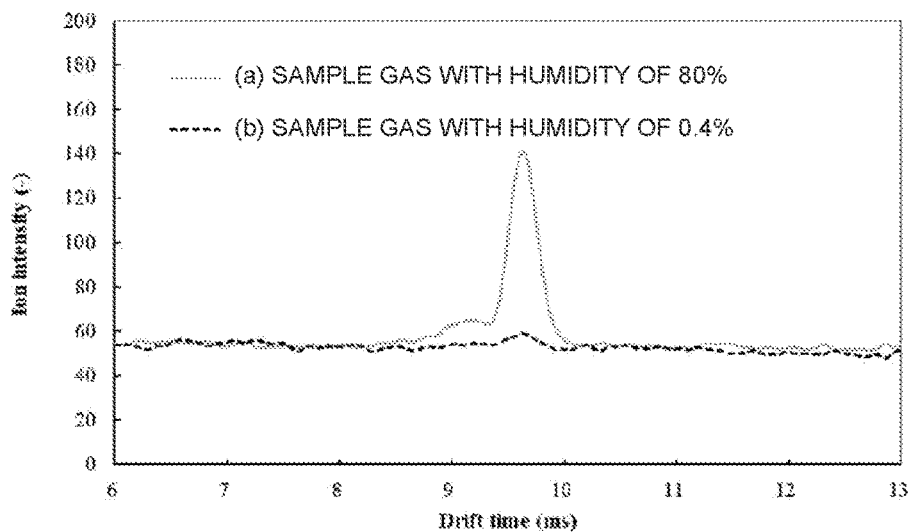
FIG. 3C is a graph presenting an IMS spectrum.

An IMS spectrum obtained by using air with the relative humidity of 80% as the sample gas, and an IMS spectrum obtained by using air with the relative humidity of 0.4% as the sample gas are presented in FIG. 3C. As presented in the graph in FIG. 3C, when using air with the relative humidity of 80% as the sample gas, the IMS spectrum showed an intense peak. On the other hand, when using air with the relative humidity of 0.4% as the sample gas, the IMS spectrum showed no intense peak. This is thought to be because the relative humidity of the sample gas significantly affects generation of the ions by the electrons emitted from the electron emitter 2.

Figure 4A:
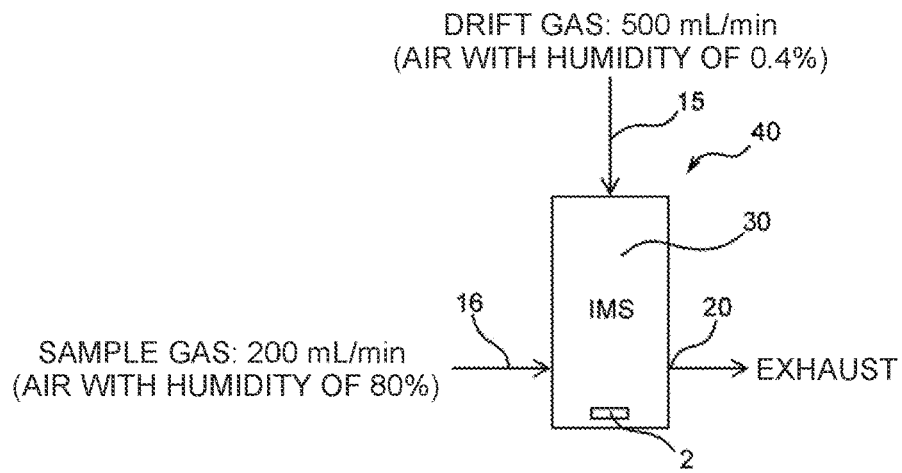
FIG. 4A is an explanatory diagram illustrating a structure of the IMS analyzer used for IMS analysis.
Figure 4B:
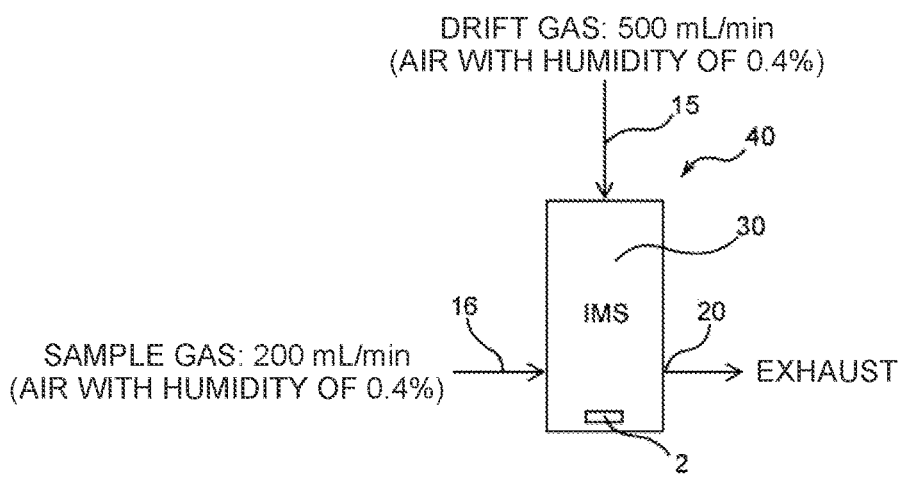
FIG. 4B is an explanatory diagram illustrating the structure of the IMS analyzer used for IMS analysis.

The IMS analyzer equipped with the electron emitter 2 as illustrated in FIG. 4A and FIG. 4B (Comparative Example) was used to perform IMS analysis for analyzing a sample gas (air with a relative humidity of 80% or air with a relative humidity of 0.4%). In this IMS analyzer, the electron emitter 2 is located away from the inlet port of the first gas injector 16, and the third gas injector 12 is not provided. Air with the relative humidity of 0.4% was used as the drift gas. The drive voltage of the electron emitter 2 was set to 16 V.

Figure 4C:
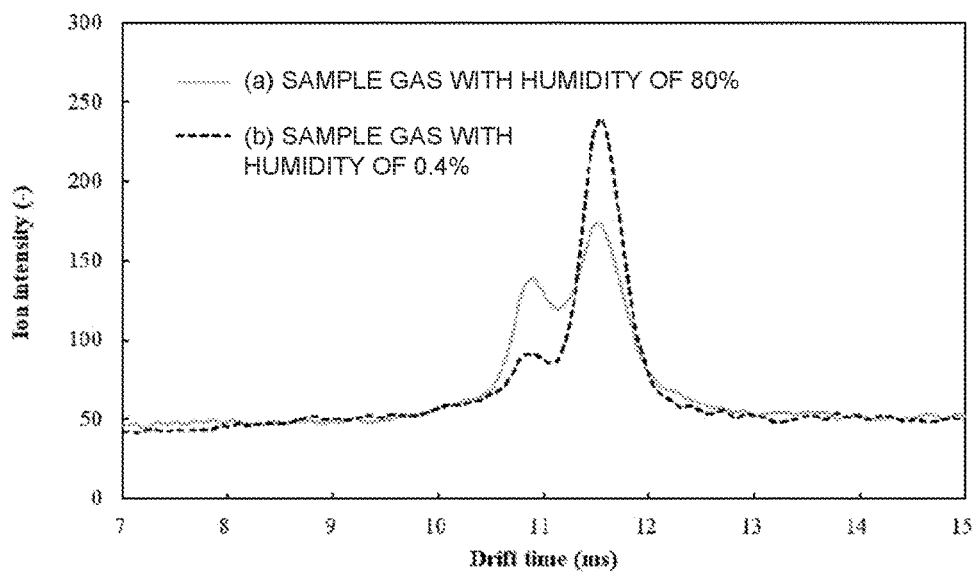
FIG. 4C is a graph presenting an IMS spectrum.

An IMS spectrum obtained by using air with the relative humidity of 80% as the sample gas, and an IMS spectrum obtained by using air with the relative humidity of 0.4% as the sample gas are presented in FIG. 4C.

As presented in the graph in FIG. 4C, when using air with the relative humidity of 80% as the sample gas, the IMS spectrum showed a peak at about 10.8 ms (drift time) and a peak at about 11.4 ms. When using air with the relative humidity of 0.4% as the sample gas, the intensity of the peak at about 10.8 ms was decreased and the intensity of the peak at about 11.4 ms was increased.

Figure 5A:
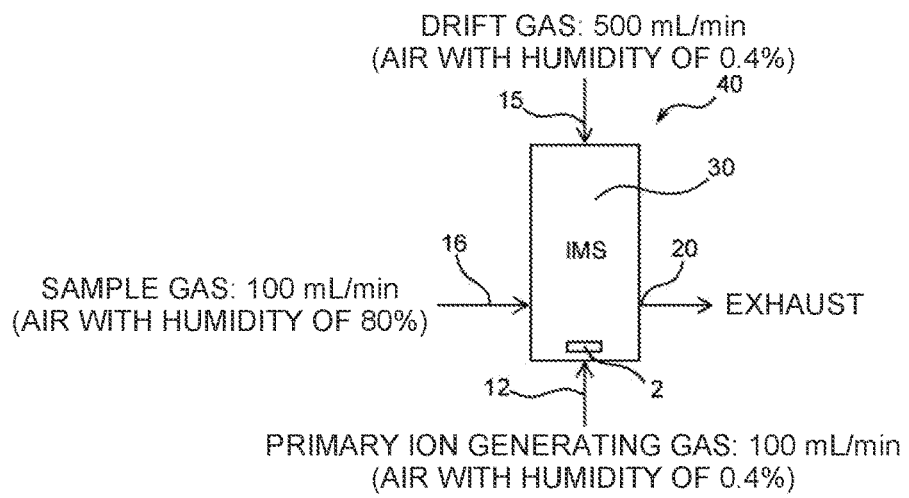
FIG. 5A is an explanatory diagram illustrating a structure of the IMS analyzer used for IMS analysis.
Figure 5B:
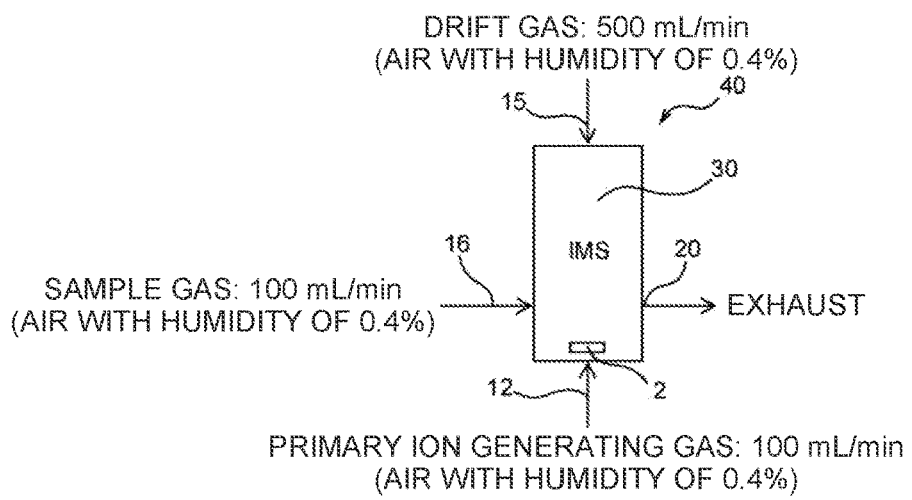
FIG. 5B is an explanatory diagram illustrating the structure of the IMS analyzer used for IMS analysis.

The IMS analyzer equipped with the electron emitter 2 as illustrated in FIG. 5A and FIG. 5B (Example) was used to perform IMS analysis for analyzing a sample gas (air with a relative humidity of 80% or air with a relative humidity of 0.4%). This IMS analyzer includes the third gas injector 12. Air with the relative humidity of 0.4% was used as the drift gas, and air with the relative humidity of 0.4% was used as the primary ion generating gas. The electron emitter 2 is located away from the inlet port of the first gas injector 16, and the third gas injector 12 injects the primary ion generating gas into the analysis chamber 30 from behind the electron emitter 2 (from the bottom electrode 3 side). The drive voltage of the electron emitter 2 was set to 18 V.

Figure 5C:
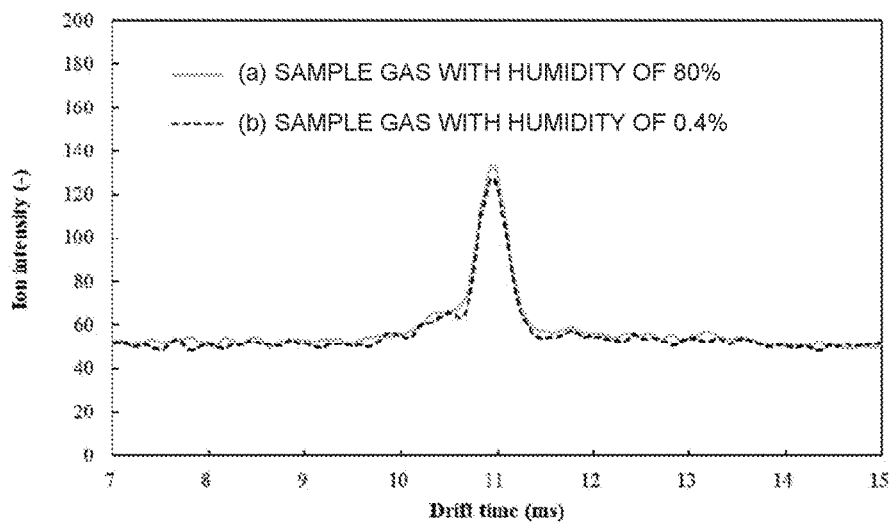
FIG. 5C is a graph presenting an IMS spectrum.

An IMS spectrum obtained by using air with the relative humidity of 80% as the sample gas, and an IMS spectrum obtained by using air with the relative humidity of 0.4% as the sample gas are presented in FIG. 5C. As presented in the graph in FIG. 5C, even when changing the relative humidity of the sample gas, there was little difference between the peak intensities in the IMS spectra. This is thought to be because the primary ions are stably generated around the surface electrode of the electron emitter 2 by allowing the primary ion generating gas to flow around the electron emitter 2, even when changing the relative humidity of the sample gas.

What is claimed is:

1. An ion mobility spectrometry (IMS) analyzer comprising:
   an analysis chamber;
   an electron emitter located in the analysis chamber;
   an ion detector located in the analysis chamber;
   a first gas injector that injects a sample gas into a reaction area of the analysis chamber;
   a second gas injector that injects a drift gas into the analysis chamber;
   a third gas injector that injects a primary ion generating gas into the analysis chamber;
   an outlet port through which the sample gas, the drift gas, and the primary ion generating gas in the analysis chamber are discharged; and
   an electrostatic gate electrode configured to control movement of ions toward the ion detector, the ions including ions generated around an electrode on an electron-emitting side of the electron emitter, wherein:
   the electrostatic gate electrode is located between the electron emitter and the ion detector,
   the first gas injector, the second gas injector, the third gas injector, and the outlet port are arranged such that the sample gas merges with the drift gas that has flowed from an ion detector side and the primary ion generating gas that has flowed from the electron emitter side in the reaction area, and the merged gas is discharged through the outlet port,
   the ion detector is located on an upperstream side of a stream of the drift gas relative to the reaction area, and the electron emitter is located on an upperstream side of a stream of the primary ion generating gas relative to the reaction area, and
   the outlet port is:
   located between the electron emitter and the electrostatic gate electrode, and is spatially overlapped with the first gas injector,
   not located between the ion detector and the electrostatic gate electrode,
   not overlapped with the electron emitter, and
   not located on a side opposite the electrostatic gate electrode relative to the electron emitter.

2. The IMS analyzer according to claim 1, wherein the first gas injector, the second gas injector, and the third gas injector inject, respectively, the sample gas, the drift gas, and the primary ion generating gas into the analysis chamber from different positions.

3. The IMS analyzer according to claim 1, wherein the third gas injector injects the primary ion generating gas into the analysis chamber while the first gas injector is injecting the sample gas into the analysis chamber.

4. The IMS analyzer according to claim 1, wherein the primary ion generating gas comprises one of moist air, an oxygen-containing gas, or a chlorine-containing gas.

5. The IMS analyzer according to claim 1, wherein a pressure in the analysis chamber is 630 hPa or higher and 1120 hPa or lower.

6. The IMS analyzer according to claim 1, wherein
   the third gas injector has an inlet port through which the primary ion generating gas is injected into the analysis chamber, and
   the electron emitter is located between the inlet port and the reaction area.

7. The IMS analyzer according to claim 1, wherein the primary ion generating gas has a higher relative humidity than the drift gas.

8. The IMS analyzer according to claim 1, wherein the primary ion generating gas has a relative humidity of 0.5% or higher and 10% or lower.

* * * * *